United States Patent [19]

Ito et al.

[11] Patent Number: 4,913,868

[45] Date of Patent: Apr. 3, 1990

[54] METHOD FOR MAKING POROUS MOLD FOR PRESSURE SLIP CASTING

[75] Inventors: Haruyuki Ito; Akio Matsumoto, both of Kitakyushu, Japan

[73] Assignee: Toto Ltd., Kitakyushu, Japan

[21] Appl. No.: 77,657

[22] Filed: Jul. 24, 1987

[30] Foreign Application Priority Data

Jul. 26, 1986 [JP] Japan ................................ 61-176370

[51] Int. Cl.[4] ....................... B29C 39/12; B29C 39/26; B29C 41/22; B29C 41/38

[52] U.S. Cl. .................................... 264/135; 264/225; 264/254; 264/255; 264/299; 249/113; 249/141; 249/114.1; 425/85

[58] Field of Search .................... 264/86, 87, 129, 130, 264/133, 134, 135, 219, 220, 225, 226, 227, 221, 246, 247, 250, 251, 264, 271.1, 275, 278, 299, 300, 304, 307, 313, 317, DIG. 43, DIG. 63, DIG. 64, 254, 255; 249/58, 62, 113, 114 R, 115, 134, 135, 141, 160, 142; 425/84, 85, 86, 437, 812, DIG. 102, DIG. 33

[56] References Cited

U.S. PATENT DOCUMENTS

| | | | |
|---|---|---|---|
| 3,243,860 | 4/1966 | Whittaker et al. | 425/84 |
| 3,723,584 | 3/1973 | Nussbaum | 264/219 |
| 3,993,727 | 11/1976 | Skriletz | 264/87 |
| 4,413,966 | 11/1983 | Mills | 264/86 |

FOREIGN PATENT DOCUMENTS

| | | | |
|---|---|---|---|
| 0211653 | 2/1987 | European Pat. Off. | 264/87 |
| 5817811 | 4/1963 | Japan . | |
| 56-14451 | 4/1981 | Japan . | |
| 58-208005 | 12/1983 | Japan . | |
| 60-8010 | 1/1985 | Japan . | |
| 0179212 | 9/1985 | Japan | 264/219 |
| 1295055 | 11/1972 | United Kingdom . | |

*Primary Examiner*—Jay H. Woo
*Assistant Examiner*—Jeremiah F. Durkin, II
*Attorney, Agent, or Firm*—Fleit, Jacobson, Cohn, Price, Holman & Stern

[57] ABSTRACT

A method of making a porous mold for pressure slip casting. A surface porous layer is cast which has an average pore diameter of at most 20 microns and a thickness of 5 to 40 mm. An adhesive is applied in a pattern to the rear surface of the surface porous layer to leave an unapplied portion on the rear surface. A coarse porous layer is applied to the adhesive applied and unapplied portions of the rear surface of the surface porous layer which is made of a mixture of liquid resin and a filler of a particle diameter of 0.1 to 5.0 mm at a volume ratio of 15 to 50:100. The coarse porous layer has a thickness of 5 to 30 mm. A sealing adhesive is applied to the surface of the coarse porous layer and means is applied for passage of water from and air into the coarse porous layer.

6 Claims, 3 Drawing Sheets

METHOD FOR MAKING POROUS MOLD FOR PRESSURE SLIP CASTING

BACKGROUND OF THE INVENTION

1. Field of the Invention

The present invention relates to both a porous mold used in pressure slip casting and a method of making the porous mold.

2. Description of the Prior Art

In the pressure casting process, the mold is required to have both passages for draining the water, which is forced from the molding surface of the mold into a porous layer, to the outside of the mold during high-pressure slip casting, and passages for supplying compressed air into the porous layer to spurt water or air from the molding surface through the porous layer when the cast product is to be removed from the mold.

Therefore, the mold used in the prior art is equipped with passages formed inside or at the rear surface of the porous layer to have communications with the outside of the mold.

Before entering into a detailed description of the present invention, cursory review of the prior art will be made in the following with reference to the accompanying drawings. FIG. 1 shows a mold which has channels 2 formed in the rear surface of a porous layer 1 as the passages. In a mold shown in FIG. 2, the channels 2 are formed in the porous layer 1 in parallel with the molding surface of the mold. In a mold shown in FIG. 3, the channels 2 extend into the porous layer 1 in relation perpendicular to the molding surface of the mold. In any of these examples, the porous layer 1 has its rear surface backed with a backing material 3.

These channels are so accurately pitched and spaced from the molding surface of the mold that the water and air may be spurted evenly from the molding surface when the cast product is to be removed from the mold. As a result, the channels raise difficulties in making the porous mold. If the porous layer is made thinner, the water and air cannot be injected evenly from the inner surface of the porous layer, i.e., the molding surface of the mold unless the channels have its smaller pitch. However, it is difficult to form the channels at a small interval. This difficulty raises a defect that the porous layer has to be made thicker than necessary.

In order to overcome these defects, various molds have been proposed by Japanese Patent Laid-Open No. 17811 / 1973 and Japanese Patent Publication No. 14451 / 1981. According to the process disclosed in Japanese Patent Laid-Open No. 17811 / 1973, a two-layered structure is made by coating a mold of known plastic foam with a known porous material such as gypsum or the like However, this process cannot control the pore diameter of the surface porous layer accurately but makes the surface porous layer excessively thin. From the restriction to the material of a coarse porous layer, moreover, this process is remarkably difficult to provide a mold for forming large-sized ceramic articles having a complicated shape.

Japanese Patent Publication No. 14451 / 1981 discloses a porous mold having a fine porous layer and a coarse porous layer integrated with each other by press working and subsequent sintering. The porous layers are formed from a mixture of resin powder and filler powder, the fine porous layer has a thickness of 0.3 to 5 mm as a surface layer.

The pressing working, however, makes it remarkably difficult to make a large-sized mold having a complicated shape. It is also remarkably difficult to control the pore diameter of the surface porous layer which plays an important role in the pressure slip casting process. Because of the sintering, moreover, dispersions may be incorporated into the sizing accuracy, strength and pole diameter so that the process is not appropriate for making the mold for pressure casting of the large-sized ceramic articles having the complicated shape.

There can be conceived another process for making a mold by merely adhering a surface fine porous layer prepared in advance and a rear coarse porous layer also prepared in advance to each other by means of an adhesive which is applied in a linear or net pattern having appropriate interval and width. In making the large-sized and complicated mold, however, the adhesive may have a tendency to slip the surface fine porous layer and the rear coarse porous layer relative to each other. Then, the adhesive applied portion is so locally widened as to block the water and air spurting from the molding surface of the mold, when the cast product is to be removed from the mold, so that the conceived process cannot be used to make a practical mold.

According to another process conceivable, the coarse porous layer consisting of a mixture of a liquid adhesive and a filler of appropriate granularity is adhered by a pressing or stamping method to the rear surface of a surface porous layer prepared in advance. Because of a low adhesion between the surface porous layer and the coarse porous layer, however, this process cannot make a practical mold capable of standing an actual use.

SUMMARY OF THE INVENTION

It is, therefore, an object of the present invention to provide a porous mold which is made by forming a coarse porous layer on the rear surface of a porous layer prepared in advance as a mold and which is suited for pressure casting large-sized ceramic articles having a complicated shape.

Another object is to provide a method of making the above-specified porous mold.

According to one feature of the present invention, there is provided a porous mold for pressure slip casting, comprising a surface porous layer having an average pore diameter of at most 20 microns and a thickness of 5 to 40 mm; an adhesive applied in a pattern to the rear surface of said surface porous layer to leave an unapplied portion on said rear surface; a coarse porous layer covering the adhesive applied and unapplied portions of the rear surface of said surface porous layer and made of a mixture of a liquid resin and a filler of a particle size of 0.1 to 5.0 mm at a volume ratio of 15 to 50 : 100, said coarse porous layer having a thickness of 5 to 30 mm ; a sealing adhesive resin covering substantially the outer surface of said coarse porous layer; and means for passage of water from and air into said coarse porous layer.

According to another feature of the present invention, there is provided a method making a porous mold, comprising the steps of casting a surface porous layer having an average pore diameter of at most 20 microns and a thickness of 5 to 40 mm; applying an adhesive in a pattern to the rear surface of said surface porous layer to leave an unapplied portion on said rear surface; forming on the adhesive applied and unapplied portions of the rear surface of said surface porous layer a coarse porous layer made of a mixture of a liquid resin and a filler of a particle size of 0.1 to 5.0 mm at a volume ratio of 15 to 50 : 100, said coarse porous layer having a thickness of 5 to 30 mm; substantially sealing the outer surface of said coarse porous layer with a sealing adhesive resin after the first adhesive and said coarse porous layer have cured; and connecting at least one pipe to said coarse porous layer for passage of water from and air into said coarse porous layer.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENT

A method making a porous mold according to the present invention will be described in the following with reference to the accompanying drawings.

Figure 1:
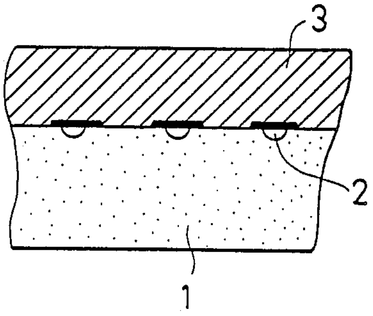
FIG.1 (PRIOR ART)
FIGS. 1 to 3 are fragmentary views showing in section the porous molds according to the prior art.
Figure 2:
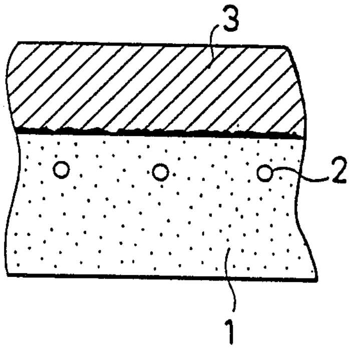
FIG.2 (PRIOR ART)
Figure 3:
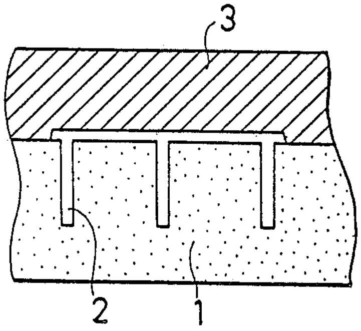
FIG.3 (PRIOR ART)
Figure 4:
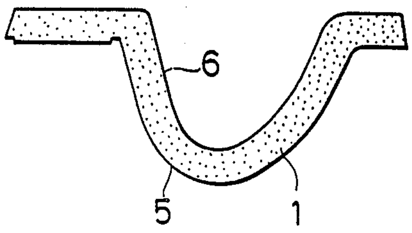
FIG. 4 is a sectional view of a surface porous layer prepared in advance as a mold.
Figure 5A:
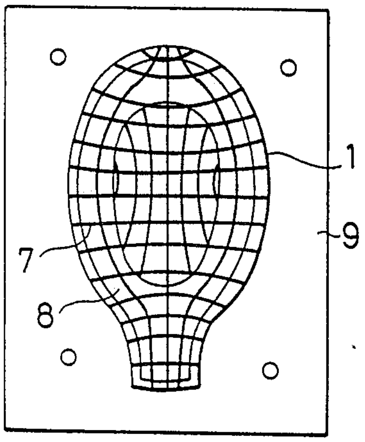
FIG. 5*a* is a top plan view of the surface porous layer placed on an under basic case.
Figure 5B:
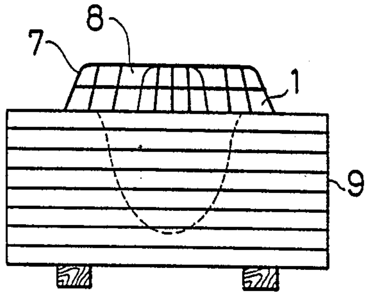
FIG. 5*b* is a front elevation of the surface porous layer of FIG. 5*a;*

FIG. 4 shows in section the surface porous layer 1 which has been prepared as a mold in advance. This surface porous layer 1 has a molding surface 5 and an opposite rear surface 6 of the mold. Prior to application of an adhesive, as shown in FIGS. 5*a* and 5*b*, the surface porous layer 1 is placed on an under basic case 9 with the molding surface 5 directed downward. Then, an adhesive is applied in a net pattern to the rear surface 6 of the surface porous layer 1 so that the rear surface 6 is patterned with an applied adhesive net 7 and an unapplied ground 8. Then, a coarse porous layer 10 composed of a mixture of a resin and a filler is pressed or stamped onto the rear surface 6 of the surface porous layer 1 so that it is firmly adhered to the surface porous layer 1 by the intervening adhesive net 7. Fluid communication is provided between the coarse porous layer 10 and the surface porous layer 1 through the unapplied ground 8.

Figure 6:
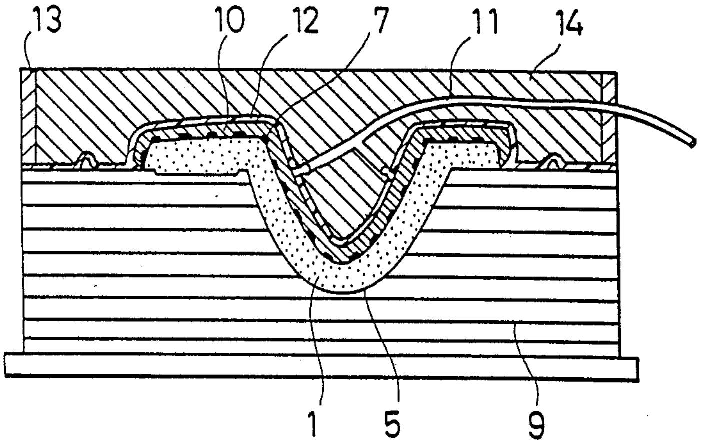
FIG. 6 shows how a porous mold according to the present invention is made on the under basic case.
Figure 7:
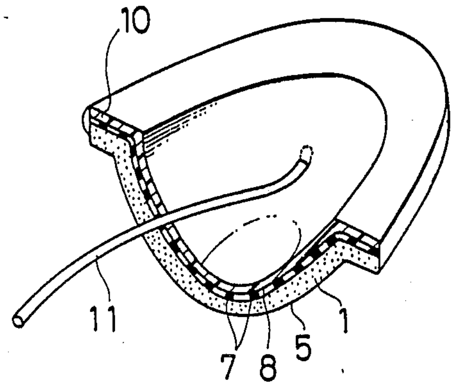
FIG. 7 is a perspective view showing in a partial section the porous mold having a coarse layer on the rear surface thereof.

As shown in FIGS. 6 and 7, a pipe 11 for passage of water/air is connected to the coarse porous layer 10, and a sealing adhesive resin 12 is applied to the outer surface of the coarse porous layer 10 and the exposed surface of the under basic case 9. Then, a reinforcing iron frame 13 is placed on the under basic case 9 and filled up with a filler or filling material 14.

The porous mold thus made according to the present invention is used as a pressure casting mold for ceramic articles, which is constructed by fitting it in the reinforcing iron frame or in a pressure-resisting container and by filling up the space between the porous mold and that reinforcing structure with the filler or filling material.

In the present invention, the surface porous layer is cast in advance to have a pore diameter of 20 microns or less. If this pore diameter is exceeded, the surface porous layer fails to act as a pressure casting filter material. On the other hand, the thickness of the surface porous layer is selected to be 5 to 40 mm. This selection is made partly because the surface porous layer thinner than 5 mm will make it difficult to spurt the water and air evenly from the molding surface when the cast product is to be removed from the mold and partly because the surface porous layer thicker than 40 mm will have its compression deformation increased by the slip pressure during the pressure casting operation to invite defects that the reaction due to the increased compression deformation causes the porous layer to bite the product thereby to make it reluctant to part the product and that the increased compression deformation makes it liable to crack the corner or corners of the mold. With these being considered together with one of the advantages of the present invention, it is concluded that the porous layer may preferably be 10 to 20 mm thick.

Next, the adhesive to be applied to the rear surface of the surface porous layer for adhering the surface porous layer and the coarse porous layer to be formed later may be suitably exemplified by a cold curing type epoxy resin, to which the present invention should not be limited. The coarse porous layer acts to provide passages for allowing the water and air to pass therethrough. The applied adhesion net and the unapplied ground between the surface and coarse porous layers should be so balanced that the water and air may be spurted evenly from the molding surface of the surface porous layer when compressed air is forced into the coarse porous layer to release the product from the mold, for example. In other words, neither the applied portion nor the unapplied portion should be excessively wide even locally. It is therefore desirable that the width of each adhesive applied be two times or less as large as the thickness of the surface porous layer. The larger width will locally leave such a portion or portions on the molding surface as obstructs the passage of the water and air to invite a difficulty in the product releasing action.

If, on the contrary, the unapplied portion or portions are excessively enlarged or widened locally, the surface porous layer will possibly be broken by the pressure of the compressed air for releasing the product. The maximum area, width and so on of the unapplied portion or portions may be determined depending upon the strength and thickness of the surface porous layer and the coarse porous layer and upon the product releasing air pressure. Therefore, the adhesion should be applied in the net pattern or in a linear or dot pattern so that the width or area of the unapplied ground may be as even as possible.

Next, the applied portion or portions are required to have such area and evenness that they may not be separated at their interfaces with the surface porous layer or the coarse porous layer by the compressed air supplied for releasing the product. In this case, too, the ratio of the area to which the adhesive is applied is determined depending upon the tensile strengths of the surface porous layer and the coarse porous layer and upon the product releasing air pressure.

On the other hand, the filler or filling material to form the coarse porous layer has a particle diameter of 0.1 to 0.5 mm so as to form a coarse porous layer having an average pore diameter of 100 microns or more. This filler is mixed with a liquid resin to prepare a mixture for forming the coarse porous layer. The mixing volume ratio of the liquid resin to the filler is within a range of 15 to 50 : 100. The ratio lower than 15% will degrade the strength of the coarse porous layer and make it difficult to form the coarse layer. The ratio higher than 50% will allow the liquid adhesive to stick to the rear surface of the surface porous layer so that the water and air communications between the coarse porous layer and the surface porous layer are blocked to invite troubles when the product is to be removed.

Next, the coarse porous layer is desired to have a thickness of 5 to 30 mm. The thickness smaller than 5 mm will make the coarse porous layer itself difficult to form. On the other hand, the thickness larger than 30 mm will make nonsense for providing the water/air communication passages. In addition, the coarse porous layer will be subjected to a compression deformation, during the pressure casting process, if it is excessively thick, thus raising the aforementioned troubles. In the present invention, on the other hand, the coarse porous layer has its filler selected to have a particle size of 0.1 to 5.0 mm so that its average pore diameter is 100 microns or more. The average pore diameter below this value would result in increased resistance to the passage of air. This invites another disadvantage that an increased number of pipes for providing communications with the outside of the mold have to be connected to the coarse porous layer.

The materials to be used to make the porous mold according to the present invention will be specified in the following. The adhesive 7 may be one known under the trade name of "Adhesive Bond E250" produced by Konishi Kabushiki Kaisha. The resin or one component of the coarse porous layer 10 may be a mixture of an epoxy resin known under the trade name of "Epikote 815" and a curing agent known under the trade name of "Epomate B002" produced by Yuka Shell Epoxy Kabushiki Kaisha. The filler or another component of the coarse porous layer 10 may be quartz sand having a particle size of 0.1 to 5 mm. The sealing adhesive resin 12 may be one known under the trade name of "Adhesive Bond E250" produced by Konishi Kabushiki Kaisha. The filler 14 may be cement mortar or concrete.

According to the present invention, as has been described hereinbefore, the adhesive is preferably applied in the net, linear or dot pattern to the porous layer, which has been prepared as the mold in advance, so that the net, linear or dot pattern may be adhered while the coarse porous layer is being formed. As a result, it is possible to provide without difficulty the porous mold which is suited for pressure casting the large-sized ceramic articles having a complicated shape. Moreover, the water/air communications between the two porous layers are improved while preventing the water and air from leaking to the outside by the sealing adhesive resin cover. As a result, the water and air are allowed to spurt evenly from the molding surface so that the product can be effectively removed from the mold.

Thus, the present invention can provide both the porous mold, which can be used for pressure casting ceramic articles and a method of making the porous mold.

What is claimed is:

1. A method of making a porous mold for pressure slip casting large size ceramic articles, comprising the steps of:

casting a fine porous mold layer having an average pore diameter of at most 20 microns and a thickness of 5 to 40 mm;

applying an adhesive in a pattern to a rear surface of said fine porous mold layer to leave an unapplied portion on said rear surface;

mixing a liquid resin and a filler of a particle size of 0.1 to 5.0 mm at a volume ratio of 15 to 50:100;

forming a coarse porous mold layer directly on the adhesive applied and unapplied portions of said rear surface of said fine porous mold layer, and said coarse porous mold layer having a thickness of 5 to 30 mm and made of the mixture of the liquid resin and the filler;

curing the first adhesive and said coarse porous mold layer;

substantially sealing an outer surface of said coarse porous mold layer with a sealing adhesive resin after the first adhesive and said coarse porous mold layer have cured; and connecting at least one pipe to said coarse porous mold layer for passage of water from and air into said coarse porous mold layer.

2. A porous mold making method according to claim 1, wherein said pattern is selected from the group consisting of net, linear and do patterns.

3. A porous mold making method according to claim 1, wherein said coarse porous mold layer forming step includes the sub-step of pressing said mixture of said liquid resin and said filler to form said coarse porous mold layer onto said fine porous mold layer.

4. A porous mold making method according to claim 1, wherein said coarse porous mold layer forming step includes the sub-step of stamping said mixture of said liquid resin and said filler to form said coarse porous mold layer onto said fine porous mold layer.

5. A porous mold making method according to claim 1, wherein said coarse porous mold layer has an average pore diameter of at least 100 microns.

6. A porous mold making method according to claim 1, wherein the pattern of said adhesive has a width at most two times as large as the thickness of said fine porous mold layer.

* * * * *